(12) United States Patent
Musuluri

(10) Patent No.: US 10,579,660 B2
(45) Date of Patent: Mar. 3, 2020

(54) SYSTEM AND METHOD FOR AUGMENTING SEARCH RESULTS

(71) Applicant: Aravind Musuluri, Johns Creek, GA (US)

(72) Inventor: Aravind Musuluri, Johns Creek, GA (US)

( * ) Notice: Subject to any disclaimer, the term of this patent is extended or adjusted under 35 U.S.C. 154(b) by 750 days.

(21) Appl. No.: 14/643,729

(22) Filed: Mar. 10, 2015

(65) Prior Publication Data
US 2015/0254306 A1   Sep. 10, 2015

Related U.S. Application Data

(60) Provisional application No. 61/950,253, filed on Mar. 10, 2014.

(51) Int. Cl.
*G06F 17/30* (2006.01)
*G06F 16/338* (2019.01)

(52) U.S. Cl.
CPC ................... *G06F 16/338* (2019.01)

(58) Field of Classification Search
CPC ......... G06F 17/30398; G06F 17/30507; G06F 17/30867
USPC .......................................................... 707/771
See application file for complete search history.

(56) References Cited

U.S. PATENT DOCUMENTS

| | | | | |
|---|---|---|---|---|
| 6,564,208 B1 * | 5/2003 | Littlefield | ............... | G06Q 30/02 |
| 8,099,406 B2 * | 1/2012 | Lee | .......................... | G06F 16/00 707/706 |
| 8,290,927 B2 * | 10/2012 | Kawale | ............... | G06F 16/9535 707/708 |
| 8,346,791 B1 | 1/2013 | Shukla et al. | | |
| 8,626,491 B2 * | 1/2014 | Gattani | .................... | G06F 17/28 704/9 |
| 8,656,264 B2 * | 2/2014 | Newman | ............. | G06F 17/2235 715/205 |
| 8,694,526 B2 * | 4/2014 | Costello | ................. | G06Q 30/02 707/765 |
| 8,719,275 B1 * | 5/2014 | Chevalier | ......... | G06F 17/30716 707/731 |
| 8,799,276 B1 * | 8/2014 | Hyatt | .................. | G06F 16/9535 707/723 |
| 8,892,591 B1 * | 11/2014 | Haugen | ................. | G06F 16/338 707/767 |
| 8,924,395 B2 * | 12/2014 | Wade | .................... | G06Q 50/184 707/741 |
| 8,977,639 B2 * | 3/2015 | Petrou | ..................... | G06F 16/95 707/766 |
| 2004/0100510 A1 * | 5/2004 | Milic-Frayling | ........................... | G06F 17/30905 715/864 |
| 2007/0185835 A1 | 8/2007 | Ursitti et al. | | |
| 2009/0287676 A1 * | 11/2009 | Dasdan | .................. | G06F 16/95 |
| 2010/0114874 A1 * | 5/2010 | Hansson | ........... | G06F 17/30864 707/722 |

* cited by examiner

*Primary Examiner* — Sheree N Brown

(57) ABSTRACT

Systems and methods are provided to augment the search results of a search operation are provided. The method enhances a user's experience by identifying and displaying information within the search results which is of a remarkable value. Such information may be presented with a different presentation semantics from the rest of the search result. Such presentation semantics being indicative of the remarkability of the information.

10 Claims, 6 Drawing Sheets

| Classification | Presentation Semantics |
|---|---|
| Very Bad | Font color: dark red |
| Bad | Font color: red |
| Good | Font color: blue |
| Very Good | Font color: dark blue |
| World Record | Font color: dark orange; text decoration: underline |

FIG. 4

SYSTEM AND METHOD FOR AUGMENTING SEARCH RESULTS

CROSS REFERENCE TO RELATED APPLICATION

This application claims priority to U.S. Provisional Application Ser. No. 61/950,253 entitled Search Results Display filed on Mar. 10, 2014, which is incorporated herein by reference.

TECHNICAL FIELD

The present disclosure generally relates to search engine operations and methods to display the results of a search operation. Particularly, the disclosure relates to a system and method for augmenting the results of a search operation by identifying for the user information in the results that is of a remarkable nature.

BACKGROUND

The statements in this section merely provide background information related to the present disclosure and may not constitute prior art.

It is commonly required in the field of Information Technology to provide a service that searches through data sources. The data source herein may refer to data and/or document(s) on the Internet, intranet, storage devices, and so on. In order to use a search engine, a user seeking information on a desired topic generally inputs a search query consisting of keyword(s) or phrase(s) relevant to the topic into the search interface of the search engine. In response, the search engine typically displays a report with a prioritized list of links pointing to relevant documents containing the search keywords. Oftentimes, a short summary of text i.e., extract/snippet is also included for each result. The extract/snippet is that portion or portions of the text in the document that contain the keywords from the search query. In addition, to facilitate easy understanding of the search results, the keyword(s) from the search query contained in the extracts may be highlighted.

US 20120150861 A1 disclosed a method of identifying answers to search queries and highlighting the answers when they appear in search results. This is however limited to the answers in the snippet merely to direct the user's attention to the answers.

While highlighting the keywords and answers in search results is helpful, it is not sufficient in fully understanding the search results. A drawback in such limited highlighting in the search results is that it does not help the user in understanding the significance of the information in the search results, thereby making the results less useful to the user.

Another drawback of the existing search results is that it takes the user considerable amount of time and effort to understand the found results. There are no clues in the search results which will help the user to quickly identify remarkable information within the search results.

In view of the above drawbacks, there remains a need for an effective method of searching data sources for useful information relating to topics of interest.

SUMMARY

The following presents a simplified summary of the disclosure in order to provide a basic understanding to the reader. This summary is not an extensive overview of the disclosure and it does not identify key/critical elements of the disclosure or delineate the scope of the disclosure. Its sole purpose is to present some concepts disclosed herein in a simplified form as a prelude to the more detailed description that is presented later.

The present disclosure generally relates to methods and systems for searching data sources for information. Particularly, the invention relates to a computer implemented method of augmenting the search results in a multi-document search environment, said method comprising (a) Identifying remarkable data (a) Predefining identification rules for said remarkable data (c) Storing in a storage unit at least one such identification rule; wherein the identification rule comprises attributes selected from the group comprising a key, a value, classification, clarification and combinations thereof (d) Identifying at least one such remarkable data within the search results (e) highlighting at least a portion of the remarkable data within the search results.

A remarkable data in accordance with the invention is to be interpreted broadly to include any value associated with a key that is of a remarkable nature as determined by the system. The classification attribute in the identification rule identifies the type of such remarkable data and may be selected from the group comprising a good value, a bad value, a record, and combinations thereof. The clarification attribute in the identification rule gives additional information regarding the remarkable data.

In one embodiment of the invention, the remarkable data within the search results are highlighted based on the identification rule. In a preferred embodiment, the remarkable data within the search results is highlighted based on the classification attribute of the identification rule.

Depending on the classification, different presentation semantics could be applied to the remarkable data. The presentation semantics selected from the group comprising font color, font size, font weight, font family, text decorations, borders, shading and combinations thereof.

In another embodiment, the clarification attribute is appended to the search result. The clarification attribute is appended to the search result by a graphical user interface element. In a preferred embodiment, wherein the graphical user interface element is a tool tip.

In a preferred embodiment of the present invention, remarkable data with similar classification attributes are presented with similar presentation semantics across all search results.

In another aspect of the present disclosure is provided with a system comprising search engine unit. The search engine unit may comprise one or more logics configured to perform the functions and operations associated with the above-disclosed methods.

In another aspect of the present disclosure is provided a computer program product executable in a memory of a search engine unit

BRIEF DESCRIPTION OF THE DRAWINGS

The drawings described herein are for illustration purposes only and are not intended to limit the scope of the present disclosure in anyway. Throughout the disclosure, like elements are represented by like reference numerals, which are given by way of illustration only and thus are not limitative of the various embodiments.

Other objects and advantages of the present disclosure will become apparent to those skilled in the art upon reading the following detailed description of the preferred embodiments, in conjunction with the accompanying drawings, wherein:

FIG. 4 depicts exemplary rules for highlighting remarkable data.

DETAILED DESCRIPTION

Figure 1:
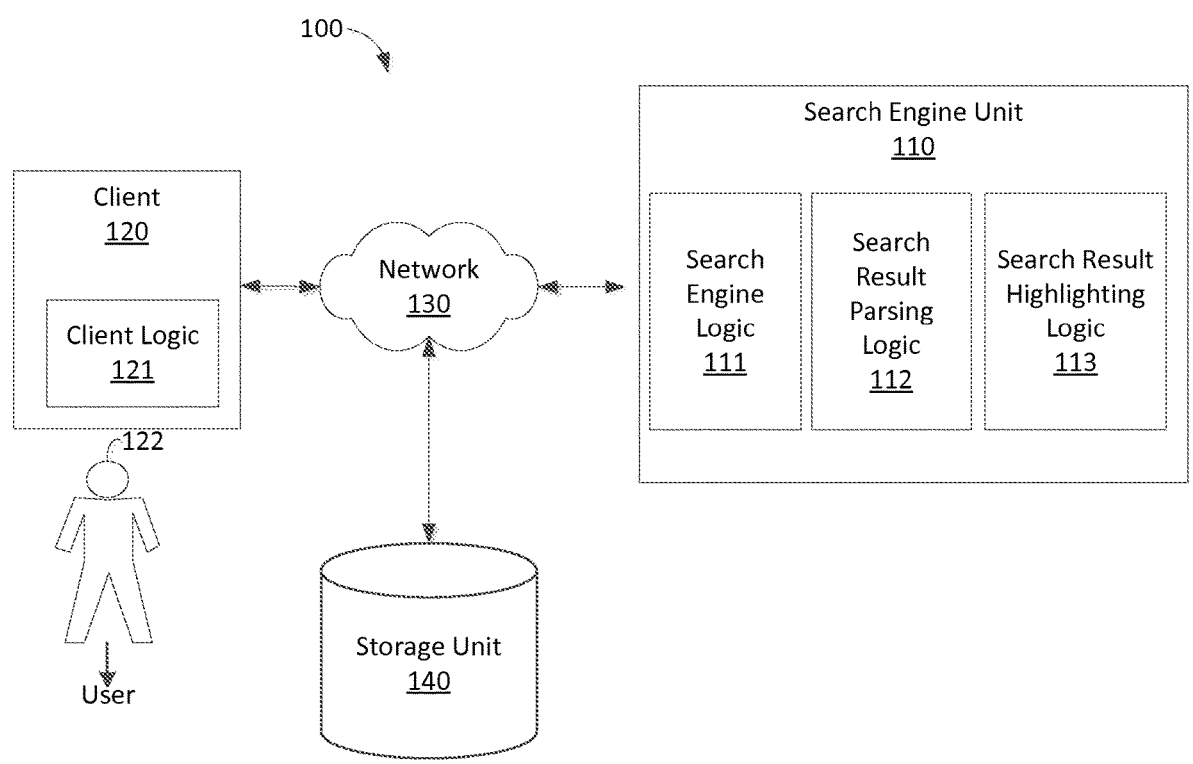
FIG. 1 is a block diagram illustrating an exemplary search environment in accordance with an embodiment of the present disclosure.

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting.

The use of "including", "comprising" or "having" and variations thereof herein is meant to encompass the items listed thereafter and equivalents thereof as well as additional items. The terms "a" and "an" herein do not denote a limitation of quantity, but rather denote the presence of at least one of the referenced item. Further, the use of terms "first", "second", and "third", and the like, herein do not denote any order, quantity, or importance, but rather are used to distinguish one element from another.

The disclosure described here is equally applicable to searching and returning links to any document containing text and optional presentation semantics (the look and feel instructions) such as, but not limited to, HTML, DHTML, XML, SGML, PDF, E-mail, Microsoft® Word documents, Microsoft® Power point documents, news group postings, multimedia objects, Graphics Interchange Format images and/or Shockwave Flash files.

Through the length of the specification and claims, the words "extract" and "snippet" are used interchangeably.

FIG. 1 depicts a search environment 100 in accordance with an exemplary embodiment of the present disclosure. It will be understood and appreciated by those of ordinary skill in the art that the computing system architecture 100 shown in FIG. 1 is merely an example of one suitable computing system and is not intended to suggest any limitation as to the scope of use or functionality of the present invention. Neither should the computing system architecture 100 be interpreted as having any dependency or requirement related to any single module/component or combination of modules/components illustrated therein.

The system 100 comprises a search engine unit 110, a client 120 and a storage unit 140. The search engine unit 110, the client 120 and the storage unit 140 all communicate over a network 130.

The network 130 can include any type of network known in the art or future-developed. In this regard, the network 130 may be an Ethernet, a local area network (LAN), or a wide area network (WAN), e.g., the Internet, or a combination of networks.

The search engine unit 110 may be a dedicated or shared server including but not limited to any type of application server, database server, or file server configurable and combinations thereof. The search engine unit 110 and the client 120 may include, but are not limited to, a computer, hand-held unit, mobile unit, consumer electronic unit, or the like.

The exemplary search engine unit 110 comprises search engine logic 111, search result parsing logic 112 and search result highlighting logic 113.

In the exemplary search engine unit 110, the search engine logic 111 may be configured to identify and construct search results for a search query.

The search engine unit 110 further comprises the search result parsing logic 112. The search result parsing logic 112 may be configured to identify keys and corresponding to each key associated value within search results. The search result parsing logic 112 identifies key/values by looking at the clues within the search result or clues from the document that the search result is extracted from. The clues may include, but not limited to, presentation semantics, format, sentence structure, natural language processing (NLP) of the search result text or the search result text in the document.

In addition, the search result parsing logic 112 may be configured to identify remarkable data among the identified key/values. The process of identifying remarkable data is further explained with reference to FIG. 3 and FIG. 5.

The remarkable data within the search results identified by the search result parsing logic 112 may be highlighted and augmented by the search result highlighting logic 113.

The storage unit 140 is configured to store information associated with search results, remarkable data identification rules, highlighting rules, or the like. In various embodiments, such information may include, without limitation, domains, URLs, webpages, websites, indexes, identification rules, highlighting rules, information associated therewith, and the like. In embodiments, the storage unit 140 is configured to be searchable for one or more of the items stored in association therewith. It will be understood and appreciated by those of ordinary skill in the art that the information stored in association with the storage unit 140 may be configurable and may include any information relevant to search results and highlighting of remarkable data, or the like. The content and volume of such information are not intended to limit the scope of embodiments of the present disclosure in any way. Further, though illustrated as a single, independent component, the storage unit 140 may, in fact, be a plurality of storage units, for instance a database cluster, portions of which may reside on the search engine unit 110, the client 120, another external computing device (not shown), and/or any combination thereof. The single unit depictions are meant for clarity, not to limit the scope of embodiments in any form.

A user 122 through the client logic 121 on the client 120 may enter a search query consisting of keyword(s) which may identify the type of information that the user is interested in retrieving. The client logic 121 may comprise, for example, an Internet browser; however, other types of client logic 121 for interfacing with the user 122 and for communicating with the search engine unit 110 may be used in other embodiments of the present disclosure. The client logic 121 transmits the user search query to the search engine unit 110 via the network 130. Upon receiving the user search query the search engine unit 110 examines the storage unit 140 and compiles a prioritized list of search results with remarkable data within the search results highlighted and returns the search results to the client logic 121 which displays the results to the user 122 in a window.

Figure 2:
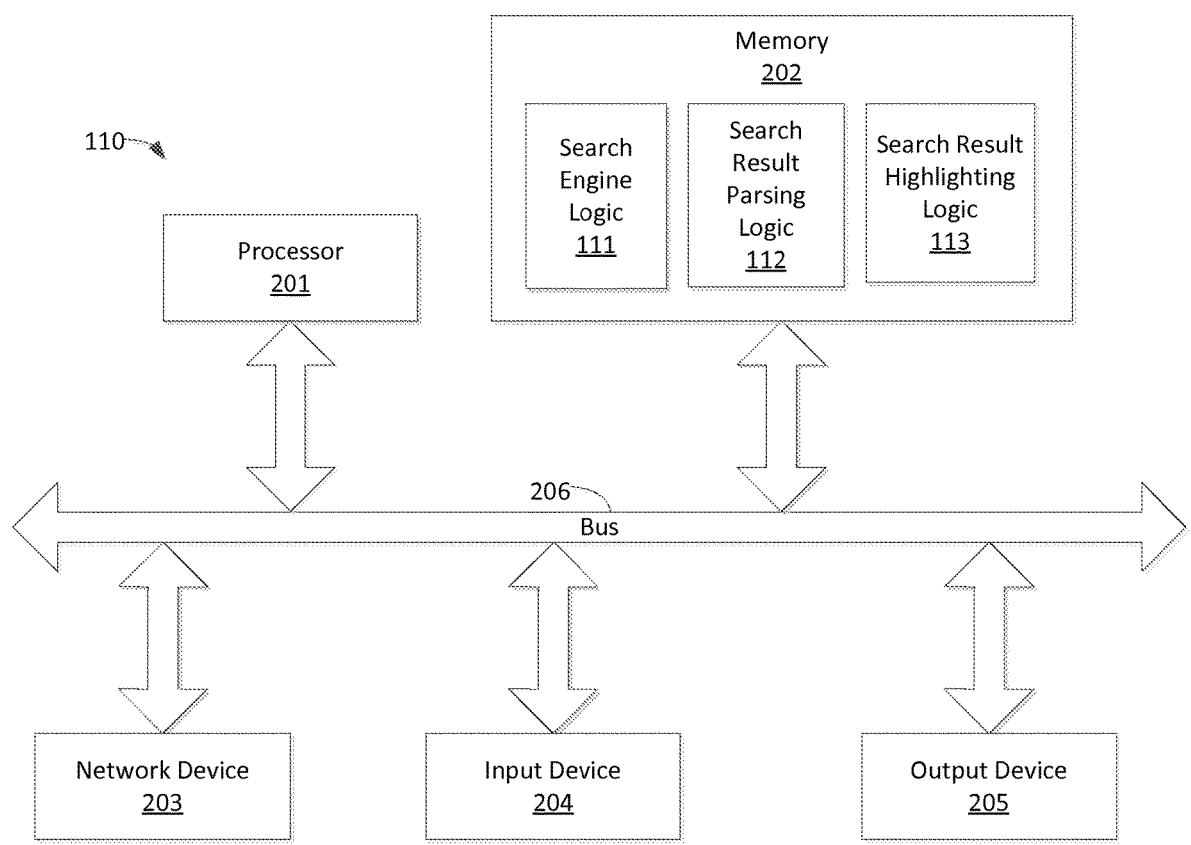
FIG. 2 is a block diagram of an exemplary computing device of FIG. 1.

In some preferred embodiments, the search engine unit 110 is shown in FIG. 2. It should be noted, however, that embodiments are not limited to implementation on such computing devices, but may be implemented on any of a variety of different types of computing units within the scope of embodiments hereof. The search engine unit 110 (as shown in FIG. 1) is only one example of a suitable computing/search environment and it is not intended to suggest any limitation as to the scope of use or functionality of the disclosure.

In some embodiments, the search engine unit 110 may include a bus 206, a processor 201, memory 202, network device 203, input device 204, and an output device 205. Bus 206 may include a path that permits communication among the components of the search engine unit 110.

The memory 202 stores the search engine logic 111, the search result parsing logic 112, and the search result highlighting logic 113 as software in memory 202.

The memory 202 may be any type of computer memory known in the art or future-developed for electronically storing data and/or logic, including volatile and non-volatile memory. In this regard, memory 202 can include random access memory (RAM), read-only memory (ROM), flash memory, any magnetic computer storage unit, including hard disks, floppy discs, or magnetic tapes, and optical discs.

The processor 201 comprises processing hardware for interpreting or executing tasks or instructions stored in memory 202. Note that the processor 201 may be a microprocessor, a digital processor, or other type of circuitry configured to run and/or execute instructions.

The network device 203 may be any type of network unit (e.g., a modem) known in the art or future-developed for communicating over a network 130 (FIG. 1). In this regard, the search engine unit 110 (FIG. 1) communicates with the storage unit 140 (FIG. 1) and the client 120 (FIG. 1) over the network 130 (FIG. 1) via the network device 203.

The input device 204 is any type of input unit known in the art or future-developed for receiving data. As an example, the input unit 204 may be a keyboard, a mouse, a touch screen, a serial port, a scanner, a camera, or a microphone.

The output device 205 may be any type of output unit known in the art or future-developed for displaying or outputting data. As an example, the output device 205 may be a liquid crystal display (LCD) or other type of video display unit, a speaker, or a printer.

Note that the disclosure may also be practiced in a distributed computing environment where tasks or instructions of search engine unit 110 (FIG. 1) are performed by multiple computing units communicatively coupled to the network.

Further note that, the search engine unit 110 (FIG. 1) components may be implemented by software, hardware, firmware or any combination thereof. In the exemplary search engine unit 110, depicted by FIG. 1, all the components are implemented by software and stored in memory 202.

Figure 3:
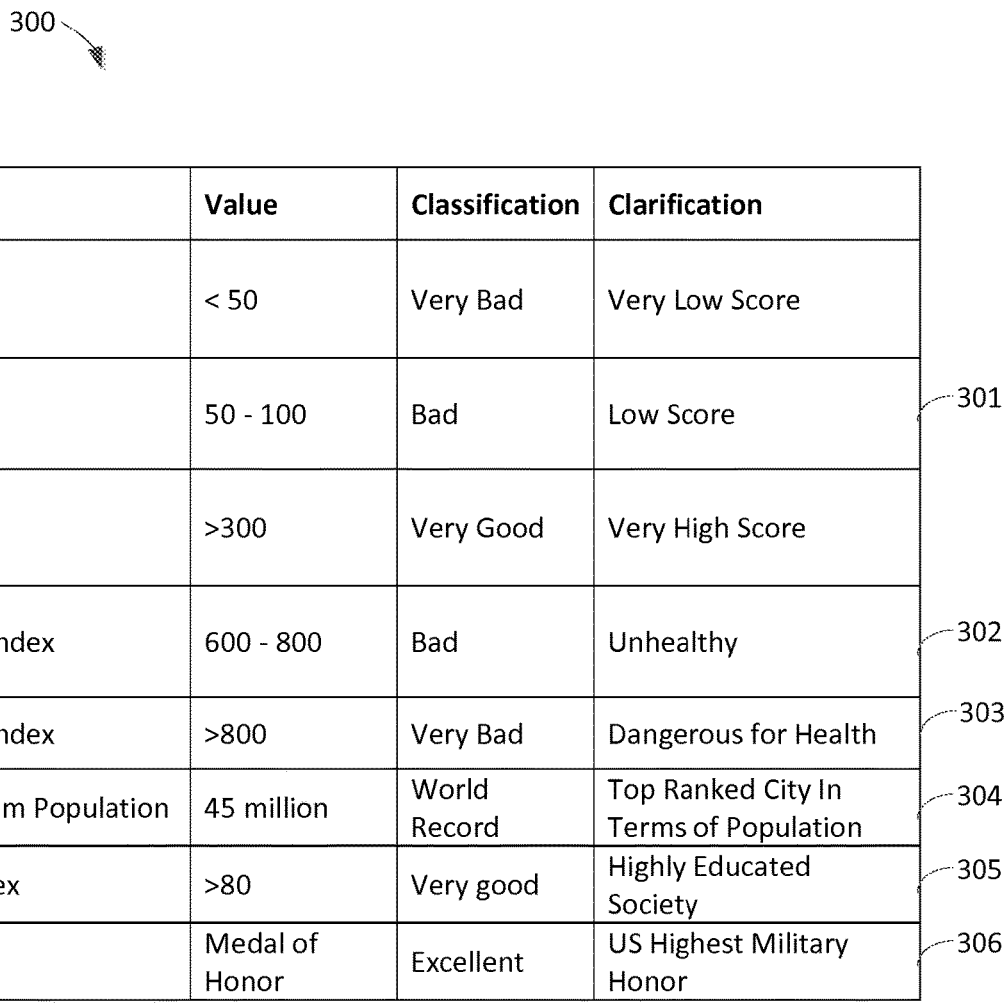
FIG. 3 depicts exemplary rules for the identification of remarkable data.

FIG. 3 depicts a portion of exemplary identification rules 300 stored in the storage unit 140 (FIG. 1) and made available to the search engine unit 110 (FIG. 1) to identify remarkable data within the search results.

The identification rules 300 comprise of keys and corresponding to each key a value. For each key and value combination in identification rules 300, there may be optional additional information which may further classify and clarify identified remarkable data.

An identification rule in 300 may identify and narrowly classify data instead of a broad classification. For example, an identification rule may identify data as remarkable data and narrowly classify as excellent, very good, good, etc. instead of a broad classification as good. Another identification rule may identify data as remarkable data and narrowly classify as world record, national record, regional record etc., instead of a broad classification as record.

Exemplary identification rule 301 comprises of key "ODI Score" and the corresponding value "50-100". This key/value combination represents a range of values between "50" and "100". This rule may identify any ODI score value between "50" and "100" in text as remarkable data with "Bad" classification and "Low Score" as the clarification for the identification.

Exemplary identification rule 304 comprises of key "Loreum Ipsum Population" and the corresponding value "45 million". This rule may identify Loreum Ipsum population value in text as remarkable data with "World Record" classification and "Top Ranked City In Terms of Population" as the clarification for the identification.

Exemplary identification rule 306 comprises of key "Award" and the corresponding value "Medal of Honor". This rule may identify any award with value medal of honor in text as remarkable data with "Excellent" classification and the "US Highest Military Honor" as the clarification for the identification.

Note that the identification rules 300 may be compiled manually or compiled automatically by parsing data sources using NLP techniques known in the art.

In the exemplary embodiment of the present disclosure, each remarkable data in search results may be presented to the user in different presentation semantics based on the remarkable data classification. In this regard, presentation semantics rules for each classification may be stored in the storage unit 140 (FIG. 1).

FIG. 4 shows a portion of exemplary presentation semantics rules 400 that may be applied for various classifications. From the presentation semantics rules 400, remarkable data classified as "Bad" may be shown in red color. Thus, remarkable data identified by the identification rules 301 and 302 (FIG. 3) may be shown in red color.

Note that the presentation semantics may not be limited to font color and text decoration. In other embodiments, presentation semantics may include, but not limited to, font weight, font family, background color, borders, shading etc.

Note that in other embodiments, all or some of the classifications may share the same presentation semantics.

Figure 5:
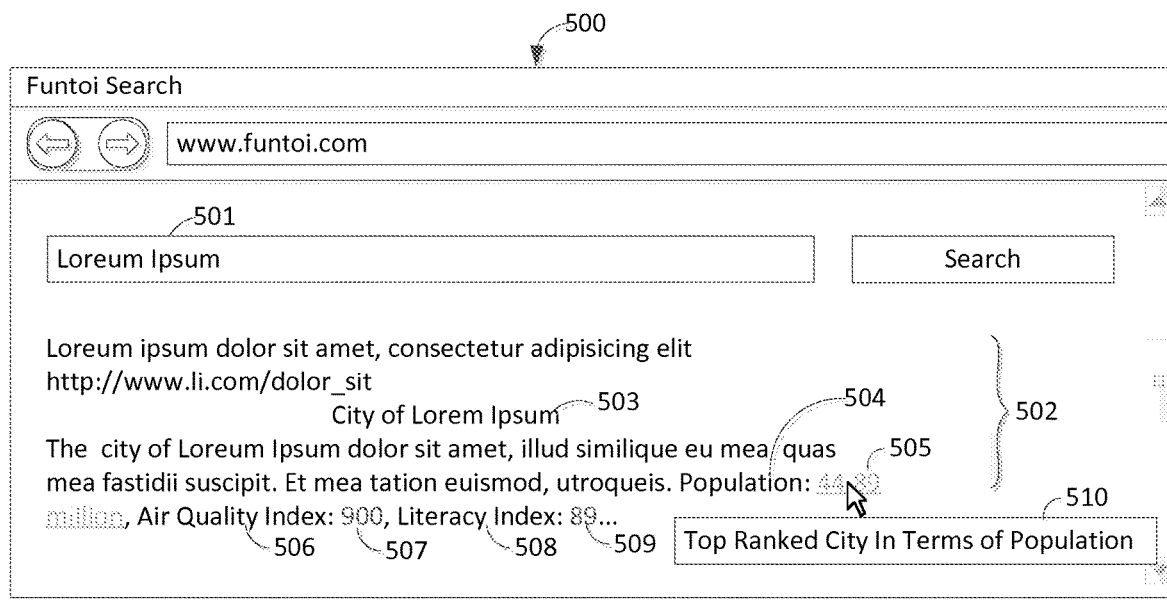
FIG. 5 depicts an exemplary search operation illustrating identifying and highlighting remarkable data in accordance with the present disclosure.

FIG. 5 depicts a GUI 500 with a portion of search results that is displayed to the user 122 (FIG. 1) by the client logic 121 (FIG. 1) with remarkable data highlighted as a result of the user searching for keywords "Loreum Ipsum" 501.

Upon receiving the search query 501, the search engine logic 111 (FIG. 1) compiles a list of search results from the storage unit 140 (FIG. 1). One such result 502 is shown in the GUI 500. Within the search result 502, the search result parsing logic 112 (FIG. 1) identifies "Population" 504 as a key and "44.89 million" 505 as its corresponding value based on the sentence structure where these two words are separated by a ":". In this example, the search result parsing logic 112 (FIG. 1) identifies the word before ":" as the key and the word after ":" as the value. However, when the search result parsing logic 112 (FIG. 1) tries to match the key "Population" 504 found in search result 502 with a key from the identification rules 300 (FIG. 3), no match is found. The search result parsing logic 112 (FIG. 1) then parses the title 503 using NLP and finds two nouns "City" and "Loreum Ipsum" and searches identification rules 300 (FIG. 3) for a matching key by appending each noun to the key "Population" 504. The key of identification rule 304 (FIG. 3) matches the combination "Loreum Ipsum" and "Population". Since broad classification for rule 304 is record, no value comparison is necessary and the key 504 value 505 is identified as remarkable data by the identification rule 304 (FIG. 3).

Key "Air Quality Index" 506 and the corresponding value "900" 507 are matched to the identification rule 303 (FIG. 1). In this case, the search result parsing logic 112 (FIG. 1) finds the match based on both the key and the value combination. The key "Air Quality Index" 506 is an exact match to the identification rule 303 key and the value "900" 507 matches the value criteria of ">800" in the identification rule 303. Hence, this key/value pair is identified as remarkable data with a classification of "Very Bad".

Similarly, key "Literary Index" 508 and corresponding value "89" 509 is identified as remarkable data by the identification rule 305 and the classification is "Very Good".

Each key/value pair in the search result 502 is considered remarkable data if at least one matching identification rule is identified by the search result parsing logic 112 (FIG. 1).

Note that for some of the key/value pairs in search results no matching key(s) may be found in identification rules 300 (FIG. 3). Hence, these key/value pairs will not be considered remarkable data.

Note that the search result parsing logic 112 (FIG. 1) may understand all the variations for a key. For example, the search result parsing logic 112 (FIG. 1) may recognize "Population of Loreum Ipsum" and "Population Loreum Ipsum" as "Loreum Ipsum Population". In another embodiment, all the variations may be stored in storage unit 140 (FIG. 1) and made available to the search result parsing logic 112 (FIG. 1).

For each remarkable data identified by the search result parsing logic 112 (FIG. 1) in the search result 502, the search result highlighting logic 113 (FIG. 1) identifies the classification from the corresponding matching identification rule. Based on the classification, the search result highlighting logic 113 (FIG. 1) identifies a highlighting rule and applies the presentation semantics from the highlighting rule to the remarkable data in the search result 502.

Key "Population" 504 and value "44.89 million" 505 is classified as "World Record" in its corresponding matching identification rule 304 (FIG. 3). Based on the "Word Record" classification, the search result highlighting logic 113 (FIG. 1) identifies highlighting rule 403 (FIG. 4) and applies presentation semantics of the highlighting rule 403 (FIG. 4) to the remarkable data value 505. Note that in GUI 500 the color of the remarkable data value 505 is orange and is underlined.

Similarly, for Key "Air Quality Index" 506 and value "900" 507 is classified as "Very Bad" in its corresponding matching identification rule 303 (FIG. 3). Based on the "Very Bad" classification, the search result highlighting logic 113 (FIG. 1) identifies highlighting rule 401 (FIG. 4) and applies presentation semantics of the highlighting rule 401 (FIG. 4) to the remarkable data value 507. Note that in GUI 500 the color of the remarkable data value 507 is dark red.

For key "Literacy Index" 508 and value "89" 509 is classified as "Very Good" in its corresponding matching identification rule 305 (FIG. 3). Based on the "Very Good" classification, the search result highlighting logic 113 (FIG. 1) identifies highlighting rule 402 (FIG. 4) and applies presentation semantics of the highlighting rule 402 (FIG. 4) to the remarkable data value 509. Note that in GUI 500 the color of the remarkable data value 509 is dark blue.

Note that in other embodiments the presentation semantics may be applied to both keys and values. In yet another embodiment the presentation semantics may be applied only to keys.

Note that in those cases where clarifications for identification rules are available, the search result highlighting logic 113 (FIG. 1) may append the clarifications from the remarkable data identification rules to the search results containing the remarkable data. In the exemplary embodiment, the search result highlighting logic 113 (FIG. 1) appends clarification attribute of the identification rule for the remarkable data to the value of the remarkable data by the tool tip graphical user interface element. Thus, when the user moves the cursor over the remarkable data value 505, the identification rule 304 (FIG. 3) clarification attribute pops up on the GUI 500 next to the remarkable data value 505.

In one embodiment, a legend may be included in the GUI 500 to indicate the presentation semantics associated with each classification.

Figure 6:
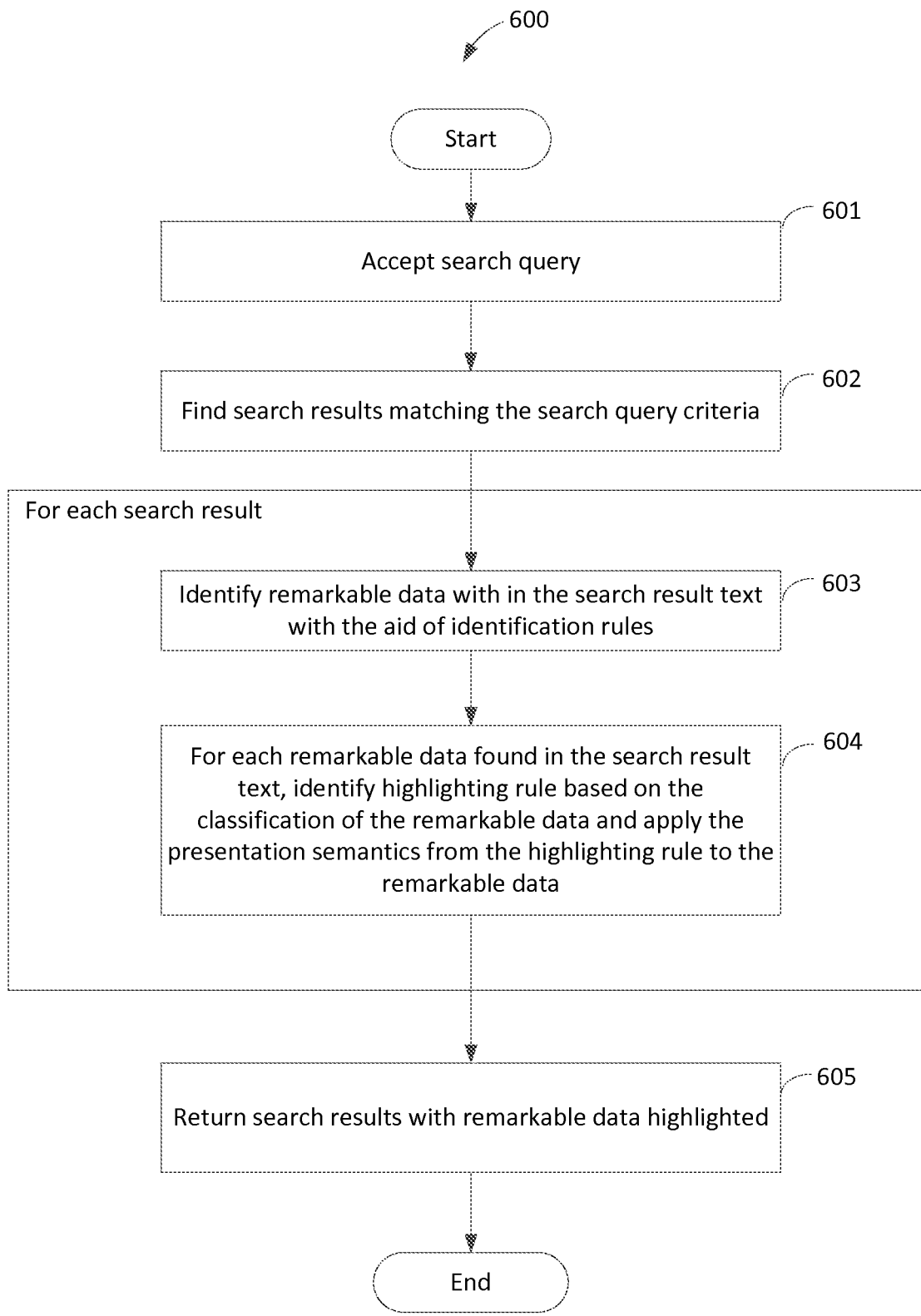
FIG. 6 is a flow diagram of a method of displaying search results comprising highlighting of remarkable data in accordance with one or more embodiments.

FIG. 6 is a flow chart illustrating one method in accordance with the present disclosure. In step 601, the search engine unit 110 (FIG. 1) may accept the search query comprising of keyword(s)/search term(s). In step 602, the search engine unit 110 (FIG. 1) may find search results matching search query criteria. For each search result, steps 603 and 604 may be performed by the search engine unit 110 (FIG. 1). In step 603, the search result parsing logic 112 (FIG. 1) may identify remarkable data within the search result text with the aid of identification rules. In step 604, the search result highlighting logic 113 (FIG. 1) for each remarkable data in the search result identifies highlighting rule based on the classification of the remarkable data and applies presentation semantics from the highlighting rule to the remarkable data. In step 605, the search results with remarkable data highlighted may be returned.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

The invention claimed is:

1. A computer implemented method of augmenting search results in a multi-document search environment comprising identifying remarkable data within the search results, wherein the remarkable data comprises a key and a value; said method comprising: (a) Predefining identification rules to identify said remarkable data wherein the identification rule comprises a key and a value, and optionally attributes selected from classification, clarification and combinations thereof; (b) Storing the said identification rules in a storage unit; (c) Identifying remarkable data within the search results by parsing the search results to identify a key/value pair within the search results; (d) Matching said key/value pair with the identification rules and identifying matched data as remarkable data within the search results; (e) Highlighting at least a portion of the remarkable data within search results using presentation semantics within the search results.

2. The method as in claim 1, wherein the classification attribute is selected from a group comprising a good value, a bad value, a record, and combinations thereof.

3. The method as in claim 1, wherein the highlighting of the remarkable data on the search result page is based on the classification attribute of the identification rule.

4. The method as in claim 1, wherein the presentation semantics are selected from a group comprising font color, font size, font weight, font family, text decorations, borders, shading and combinations thereof.

5. The method as in claim 1, wherein the presentation semantics are uniform for data having similar classification attributes.

6. The method as in claim 1, wherein the clarification attribute of the identification rule for the remarkable data is appended to the search result.

7. The method as in claim 6, wherein the clarification attribute of the identification rule for the remarkable data is appended to the remarkable data of the search result by a graphical user interface element.

8. The method as in claim 7, wherein the graphical user interface element is a tool tip.

9. A search system, comprising: one or more servers; and logic configured to receive a search query and prepare a list of search results matching the search query criteria, the logic further configured to identify remarkable data within the search results with aid of identification rules wherein the identification rule comprises a key and a value, and optionally attributes selected from classification, clarification and combinations thereof, the logic further configured to identify highlighting rule based on classification of the remarkable data and apply presentation semantics from the highlighting rule to the remarkable data and return search results with remarkable data highlighted.

10. The system as in claim 9, wherein the classification attribute is selected from a group comprising a good value, a bad value, a record, and combinations thereof.

* * * * *